(12) United States Patent
Lehman et al.

(10) Patent No.: US 10,232,687 B2
(45) Date of Patent: Mar. 19, 2019

(54) ROTATION SYSTEM FOR A VEHICLE SUN VISOR

(71) Applicant: Motus Integrated Technologies, Holland, MI (US)

(72) Inventors: Philip Allen Lehman, West Olive, MI (US); Todd Zandbergen, Holland, MI (US); Stacy Grant Frye, Zeeland, MI (US); Brent Donald Rockafellow, Holland, MI (US)

(73) Assignee: Motus Integrated Technologies, Holland, MI (US)

( * ) Notice: Subject to any disclaimer, the term of this patent is extended or adjusted under 35 U.S.C. 154(b) by 93 days.

(21) Appl. No.: 15/339,471

(22) Filed: Oct. 31, 2016

(65) Prior Publication Data

US 2017/0313164 A1    Nov. 2, 2017

Related U.S. Application Data

(60) Provisional application No. 62/330,710, filed on May 2, 2016.

(51) Int. Cl.
     *B60J 3/02*            (2006.01)
     *B29C 45/00*        (2006.01)
     (Continued)

(52) U.S. Cl.
     CPC ......... *B60J 3/0265* (2013.01); *B29C 45/0017* (2013.01); *B29C 45/14549* (2013.01);
     (Continued)

(58) Field of Classification Search
     CPC ..... B60J 3/0265; B60J 3/026; B29C 45/0017; B29C 45/14549; B29C 45/14754
     (Continued)

(56) References Cited

U.S. PATENT DOCUMENTS 6,059,348 A * 5/2000 Viertel .................. B60J 3/0252
                                                     296/97.1
6,296,293 B1 * 10/2001 Peterson ................ B60J 3/0239
                                                     296/97.1

(Continued)

FOREIGN PATENT DOCUMENTS

DE            19754533 A1     6/1999
JP             1-98019 U        6/1989

(Continued)

OTHER PUBLICATIONS

Extended European Search Report for EP Application No. 17156300.0 dated Sep. 27, 2017; 9 Pages.

(Continued)

*Primary Examiner* — Joseph D. Pape
(74) *Attorney, Agent, or Firm* — Carlson, Gaskey & Olds, P.C.

(57) ABSTRACT

A rotation system for a vehicle sun visor that includes a rod coupled to the vehicle sun visor, wherein the rod is configured to couple to a vehicle to support the vehicle sun visor within an interior of the vehicle, and the rod is configured to facilitate rotation of the vehicle sun visor about the rod. The rotation system also includes a contact element non-rotatably coupled to the rod. The rotation system further includes a biasing element configured to urge a contact surface against the contact element to control rotation of the vehicle sun visor about the rod.

18 Claims, 8 Drawing Sheets

(51) Int. Cl.
*B29C 45/14* (2006.01)
*B29L 31/30* (2006.01)

(52) U.S. Cl.
CPC ......... *B29C 45/14754* (2013.01); *B60J 3/026* (2013.01); *B29K 2995/0087* (2013.01); *B29L 2031/3035* (2013.01)

(58) Field of Classification Search
USPC ....................... 296/97.9, 97.11, 97.12, 97.13
See application file for complete search history.

(56) References Cited

U.S. PATENT DOCUMENTS

| | | |
|---|---|---|
| 2005/0200155 A1 | 9/2005 | Asai |
| 2009/0160208 A1 | 6/2009 | Sturt et al. |

FOREIGN PATENT DOCUMENTS

| | | |
|---|---|---|
| JP | H05-286363 A | 11/1993 |
| JP | H10-119572 A | 5/1998 |
| JP | H11-254962 A | 9/1999 |
| JP | 2005-119477 A | 5/2005 |
| JP | 2005170095 A | 6/2005 |

OTHER PUBLICATIONS

Japanese Office Action for JP Application No. 2017-23845 dated Feb. 27, 2018; 4 Pages.
Japanese Office Action for JP Application No. 2017-23845 dated Aug. 21, 2018; 4 Pages.

\* cited by examiner

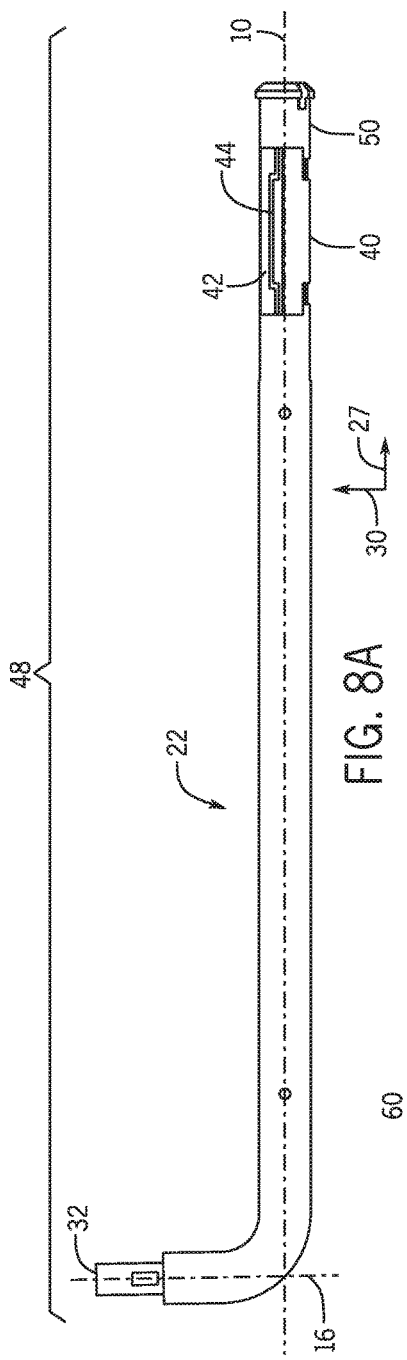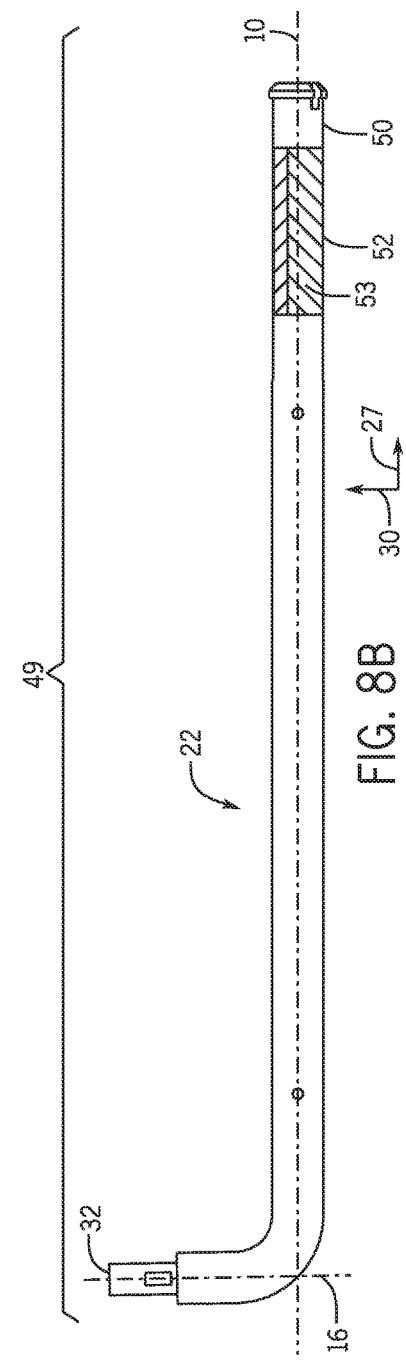

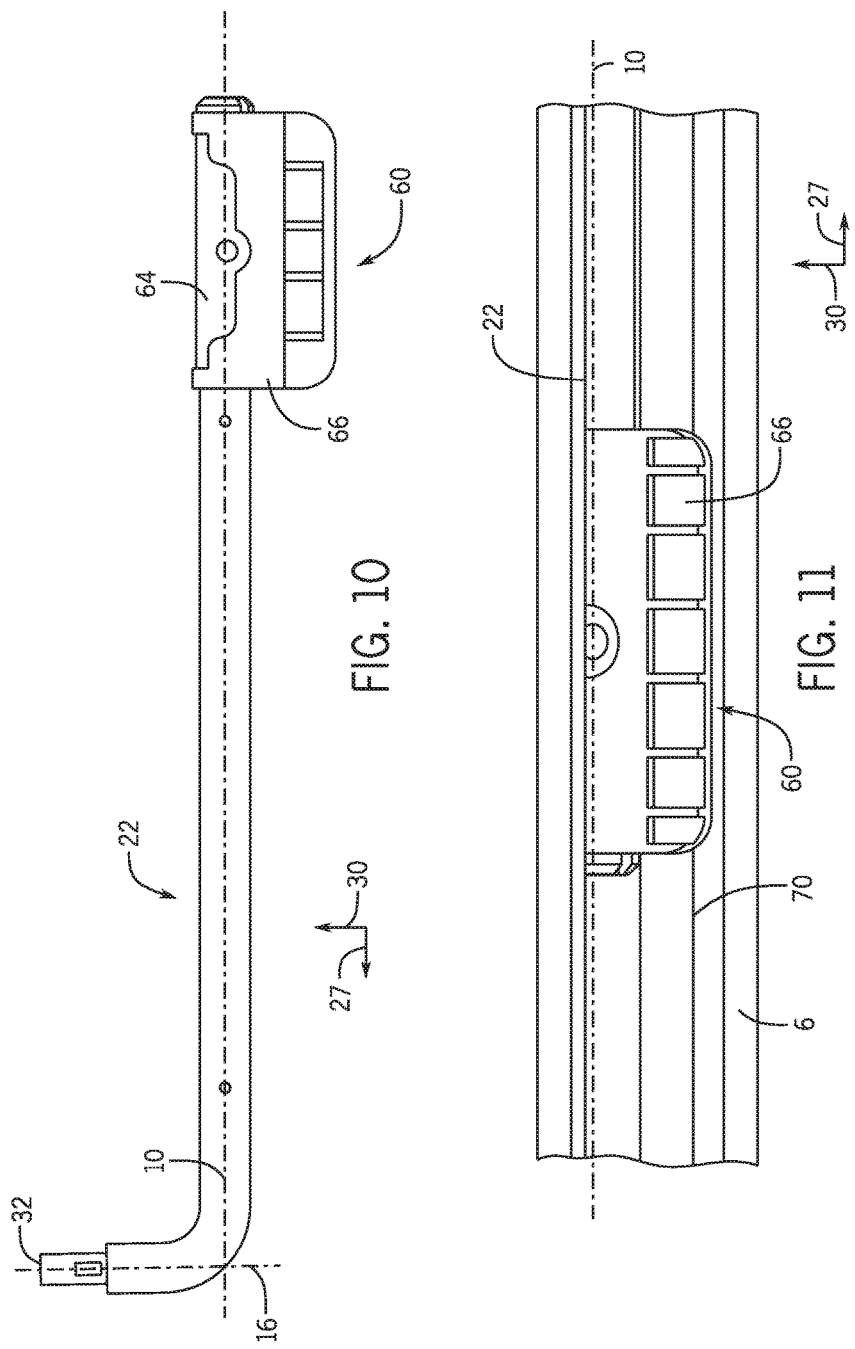

ROTATION SYSTEM FOR A VEHICLE SUN VISOR

CROSS-REFERENCE TO RELATED APPLICATION

This application claims priority to and benefit from U.S. Provisional Application No. 62/330,710, filed May 2, 2016, entitled "Rotation System for a Vehicle Sun Visor," the contents of which is incorporated by reference in its entirety.

BACKGROUND

The present disclosure relates generally to a rotation system for a vehicle sun visor.

Many vehicles employ sun visors to shield occupants from sunlight, thereby enabling the occupants to focus on the surrounding environment. For example, certain vehicles include sun visors positioned adjacent to a top portion of the windshield to facilitate access by a driver and/or front passenger. Under certain lighting conditions, a driver may rotate a respective sun visor downwardly (e.g., to a usage position) about a rod of the sun visor to reduce light transmission into the vehicle interior, thereby enabling the driver to focus on vehicle operations. However, repeatedly rotating the sun visor downwardly and upwardly (e.g., between the usage position and a stowage position) creates rotational friction on the rod, causing the rod to wear and decreasing the rod's lifetime.

BRIEF DESCRIPTION OF THE INVENTION

The present disclosure relates to a rotation system for a vehicle sun visor that includes a rod coupled to the vehicle sun visor, wherein the rod is configured to couple to a vehicle to support the vehicle sun visor within an interior of the vehicle, and the rod is configured to facilitate rotation of the vehicle sun visor about the rod. The rotation system also includes a contact element non-rotatably coupled to the rod. The rotation system further includes a biasing element configured to urge a contact surface against the contact element to control rotation of the vehicle sun visor about the rod.

The present disclosure also relates to a rotation system for a vehicle sun visor assembly prepared by a process including the step of forming a contact element. The process also includes the step of disposing the contact element at least partially about a rod of the vehicle sun visor assembly, wherein the rod includes a first material. The process further includes disposing a spring box about the contact element, wherein the spring box includes a biasing element configured to urge a contact surface against the contact element to control rotation of a sun visor about the rod, wherein the contact element includes a second material that is harder, more wear-resistant, or a combination thereof, when compared to the first material.

The present disclosure further relates to a vehicle sun visor assembly, that includes a vehicle sun visor. The vehicle sun visor assembly also includes a rod coupled to the vehicle sun visor, wherein the rod is configured to couple to a vehicle to support the vehicle sun visor within an interior of the vehicle, and the rod is configured to facilitate rotation of the vehicle sun visor about the rod. The vehicle sun visor assembly further includes a contact element non-rotatably coupled to the rod. The vehicle sun visor assembly further includes a biasing element configured to urge a contact surface against the contact element to control rotation of the vehicle sun visor about the rod. The vehicle sun visor assembly also includes a spring box configured to surround the contact element and the biasing element; wherein the spring box or the biasing element includes the contact surface.

DRAWINGS

FIG. 8A is a perspective view of an embodiment of a rod assembly having the contact element of FIG. 7 and the rod of FIG. 6, after the rod is molded.

FIG. 8B is a perspective view of an embodiment of a rod assembly having the contact element of a coating and the rod of FIG. 6, after the rod is molded.

FIG. 10 is a perspective view of the rotation system of FIG. 9, in accordance with an embodiment of the present disclosure.

FIG. 11 is a perspective view of the rotation system of FIG. 10 disposed in a channel of a sun visor, in accordance with an embodiment of the present disclosure.

DETAILED DESCRIPTION

Figure 1:
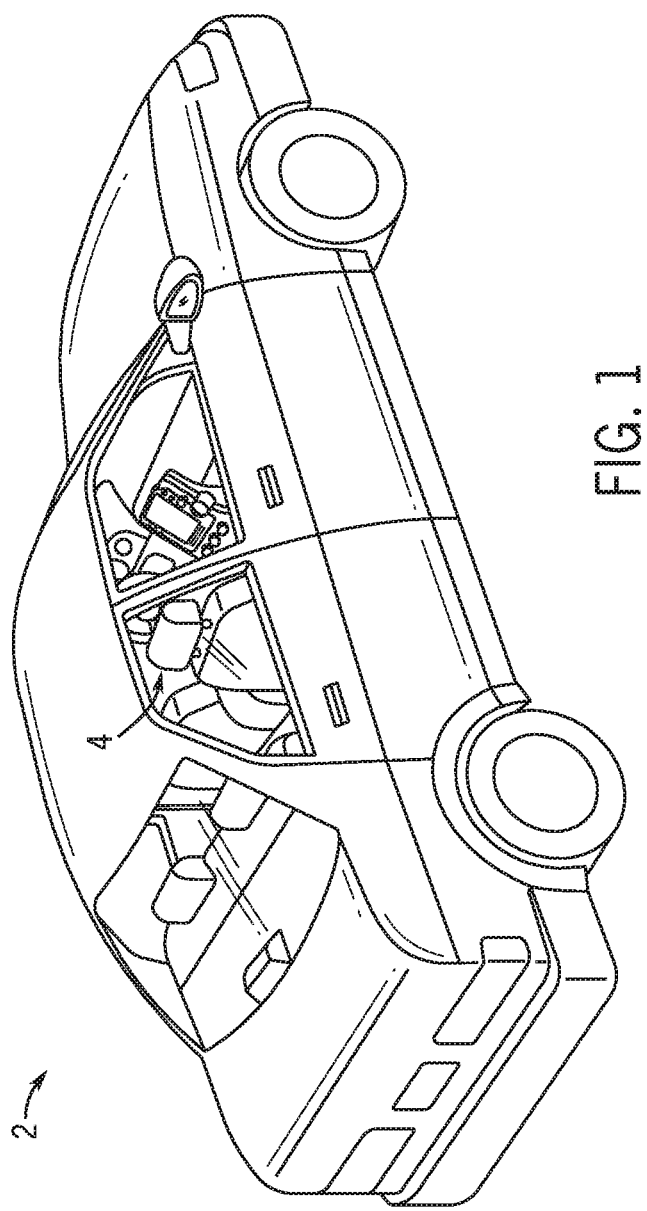
FIG. 1 is a perspective view of an embodiment of a vehicle that may include at least one sun visor having a rod assembly.

FIG. 1 is a perspective view of an embodiment of a vehicle 2. In certain embodiments, the vehicle 2 includes at least one sun visor within an interior 4 of the vehicle 2. In such embodiments, the sun visor is configured to shield a vehicle occupant from sunlight. The sun visor may be part of a sun visor assembly that include a rod configured to enable the sun visor to rotate between a stowage position and a usage position.

Figure 2:
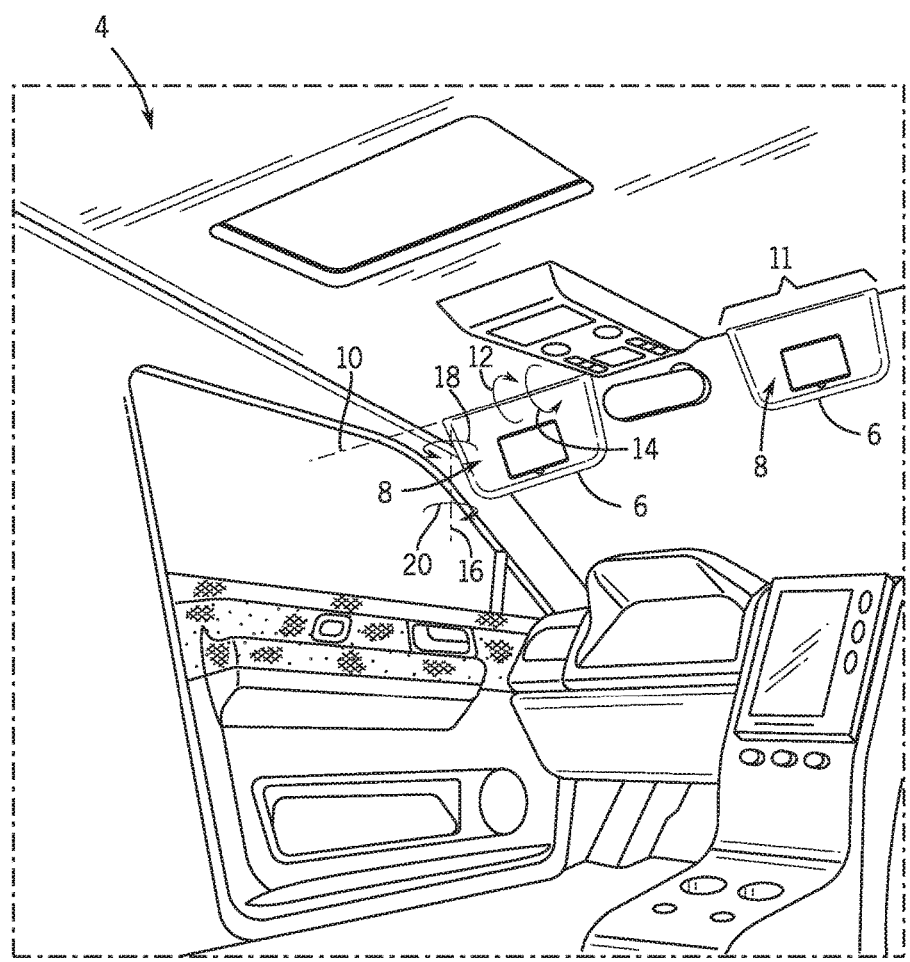
FIG. 2 is a perspective view of a part of an interior of the vehicle of FIG. 1, in which a sun visor is in a deployed position, in accordance with an embodiment of the present disclosure.

FIG. 2 is a perspective view of a part of the interior 4 of the vehicle 2 of FIG. 1, in accordance with an embodiment of the present disclosure. As illustrated, the vehicle interior 4 includes a sun visor 6 having a vanity mirror assembly 8. However, in certain embodiments, the vanity mirror assembly 8 may be omitted. In the illustrated embodiment, the sun visor 6 is configured to rotate about a first rotational axis 10 parallel to a rod of the sun visor assembly 11 between a stowage position (e.g., parallel to a headliner of the vehicle interior 4 and/or in contact with the headliner) and the illustrated usage position (e.g., deployed to reduce light transmission into the vehicle interior 4). For example, to transition the sun visor 6 from the illustrated usage position to the stowage position, a vehicle occupant may rotate the sun visor 6 in a first rotational direction 12 about the first rotational axis 10. Conversely, to transition the sun visor 6 from the stowage position to the illustrated usage position, the vehicle occupant may rotate the sun visor 6 in a second rotational direction 14 about the first rotational axis 10.

The sun visor assembly 11 may include a biasing element configured to apply pressure and/or force to the rod, such that the biasing element applies pressure to one or more flattened surfaces of the rod when the sun visor 6 is in a detent position (e.g., a stowage position, the usage position, etc.). As such, the biasing element and the flattened surface of the rod may resist moving the sun visor 6 from the detent position. However, repeatedly rotating the sun visor 6 downwardly and upwardly (e.g., between the usage position and a stowage position) creates rotational friction on the rod, causing the rod to wear and decreasing the rod's lifetime.

In the illustrated embodiment, the sun visor 6 is also configured to rotate about a second rotational axis 16 between the illustrated usage position and a second usage position (e.g., proximate to a window of the vehicle to reduce light transmission through the window). For example, to transition the sun visor 6 from the illustrated usage position to the second usage position, a vehicle occupant may rotate the sun visor 6 in a third rotational direction 18 about the second rotational axis 16. Conversely, to transition the sun visor 6 from the second usage position to the illustrated usage position, the vehicle occupant may rotate the sun visor in a fourth rotational direction 20 about the second rotational axis 16. As discussed in detail below, the sun visor 6 may move between a retracted position and an extended position while in the second usage position.

Figure 3:
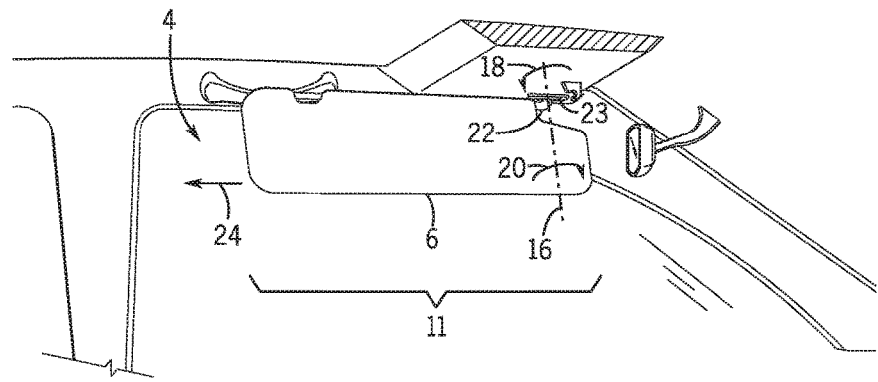
FIG. 3 is a perspective view of a part of the interior of the vehicle of FIG. 1, in which the sun visor is in a retracted position, in accordance with an embodiment of the present disclosure.

FIG. 3 is a perspective view of a part of the interior 4 of the vehicle of FIG. 1, in which the sun visor 6 is in a retracted position, in accordance with an embodiment of the present disclosure. As illustrated, the sun visor 6 is in the second usage position proximate to the window of the vehicle door. With the sun visor 6 in the second usage position, the sun visor 6 may reduce light transmission through the window, thereby shielding the vehicle occupant from sunlight. In the illustrated embodiment, the sun visor 6 is supported by the rod 22 of the sun visor assembly 11 rotatably coupled to a mounting assembly 23 of the interior 4 of the vehicle. The mounting assembly 23, in turn, is coupled to a structure of the vehicle (e.g., roof panel, interior panel, etc.). The coupling between the rod 22 and the mounting assembly 23 enables the sun visor 6 to rotate about the second rotational axis 16 in the third and fourth rotational directions 18 and 20 between the usage positions (e.g., the illustrated second usage position and the usage position shown in FIG. 2).

In the illustrated embodiment, the sun visor 6 is configured to move in a first translational direction 24 from the illustrated retracted position to an extended position. For example, as discussed in detail below, the sun visor 6 may include a slide-on-rod assembly configured to enable the sun visor 6 to slide relative to the rod 22. Accordingly, the sun visor 6 may be moved between the illustrated retracted position and the extended position to enable an occupant to place the sun visor in a location that shields the occupant from sunlight.

Figure 4:
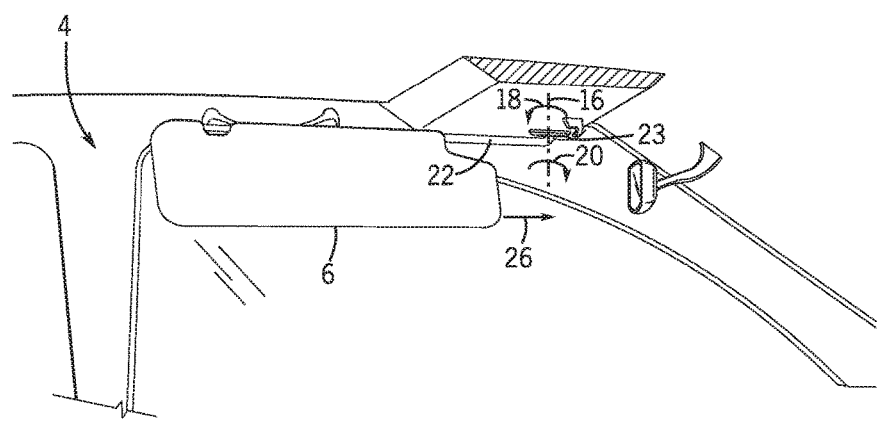
FIG. 4 is a perspective view of a part of the interior of the vehicle of FIG. 1, in which the sun visor is in an extended position, in accordance with an embodiment of the present disclosure.

FIG. 4 is a perspective view of a part of the interior 4 of the vehicle of FIG. 1, in which the sun visor 6 is in an extended position, in accordance with an embodiment of the present disclosure. As illustrated, with the sun visor 6 in the extended position, the sun visor 6 may block sunlight passing through a rear portion of the window of the vehicle door. To transition the sun visor 6 from the illustrated extended position to the retracted position, the occupant may move the sun visor 6 in a second translational direction 26. Once in the retracted position, the occupant may rotate the sun visor in the fourth rotational direction 20 about the second rotational axis 16 to the usage position shown in FIG. 2. As discussed in detail below, the sun visor may rotate about the rod 22 between the usage position shown in FIG. 2 and the stowage position (e.g., about the first rotational axis 10 in the first rotational direction 12 or the second rotational direction 14).

Figure 5:
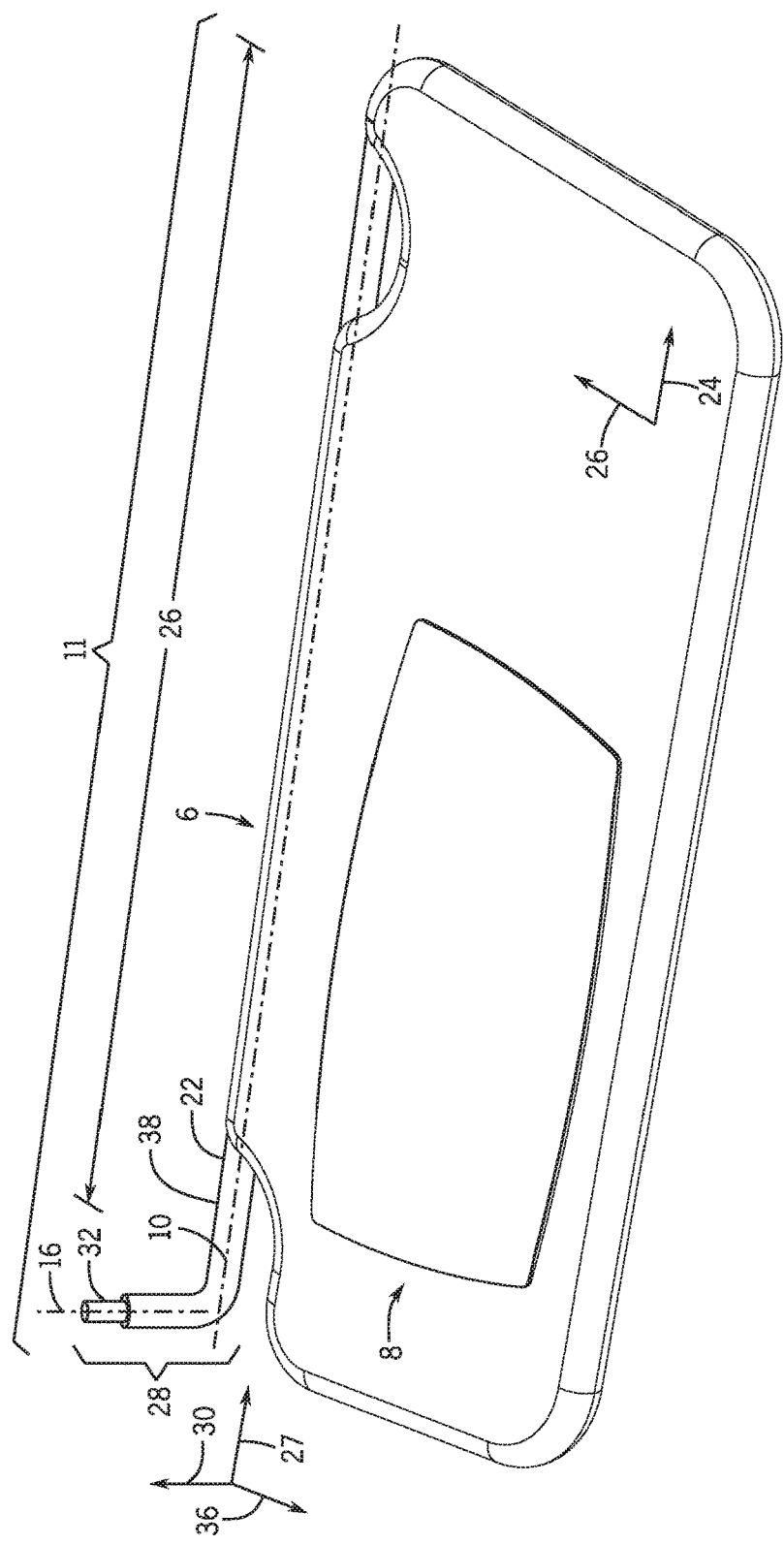
FIG. 5 is a perspective view of an embodiment of the sun visor of FIG. 2.

FIG. 5 is a perspective view of an embodiment of the sun visor 6 of FIG. 2. The sun visor 6 is configured to rotate about the first rotational axis 10 between the stowage position (e.g., parallel to a headliner of the vehicle interior) and the usage position (e.g., deployed to reduce light transmission into the vehicle interior). The sun visor 6 is coupled to a rod 22 of the sun visor assembly 11 that has a longer portion 25 extending in a lateral direction 27 (e.g., along the first rotational axis 10). The rod 22 also has a shorter portion 28 that extends in a vertical direction 30 (e.g., perpendicular to the first rotational axis 10). An end 32 of the shorter portion 28 of the rod 22 couples to mounting assembly 23 of the interior 4 of the vehicle, via a mounting bracket, for example. The rod 22 is configured to rotate about the second rotational axis 16 such that the sun visor 6 may be rotated to be positioned along a side window of the vehicle, (e.g., approximately in a longitudinal direction 36 parallel to a longitudinal centerline of the vehicle).

As illustrated, the rod 22 includes an exposed portion 38. In some embodiments, the exposed portion 38 of the rod 22 is visible when the sun visor 6 is in the extended position and not visible when the sun visor is in the retracted position. In some embodiments, the exposed portion 38 may be overmolded. In alternative embodiments, some portions of the rod 22, such as the end 32, may not be overmolded for functional reasons. For example, the end 32 may not be overmolded because the end 32 is configured to couple to the structure of the vehicle to facilitate rotation about the second rotational axis 16.

Figure 6:
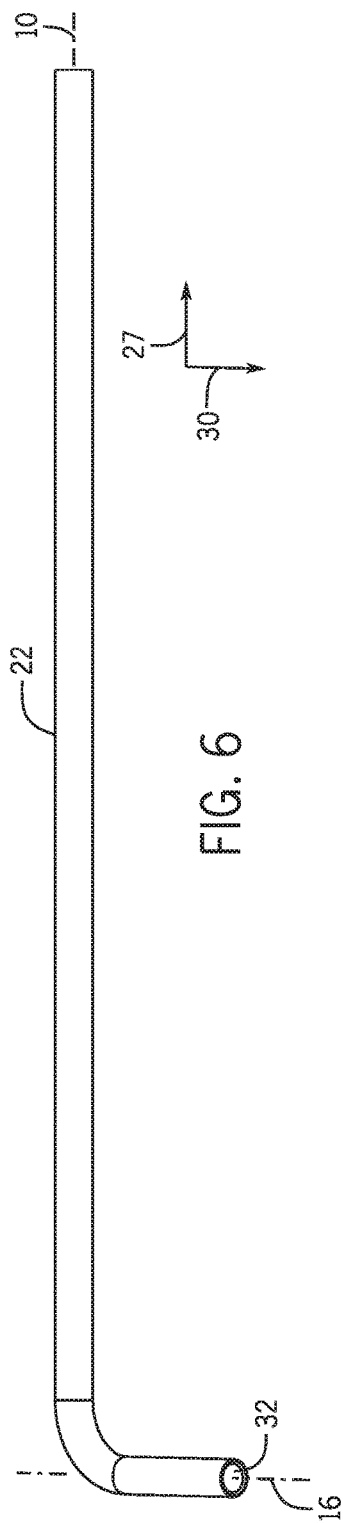
FIG. 6 is a perspective view of an embodiment of a rod that may be employed within the sun visor of FIGS. 2-4.

FIG. 6 is a perspective view of an embodiment of a rod 22 that may be employed within the sun visor assembly of FIGS. 2-4. The rod 22 may be formed from any suitable material rod to support the weight of the sun visor, such as metal, composite, plastic, or a combination thereof. For example, the rod 22 may be formed from any suitable metal, such as steel. In some embodiments, the rod 22 may be formed from a low weight metal, such as aluminum, titanium, and the like. In some embodiments, the rod 22 may be formed from a fiber composite, such as fiberglass, carbon fiber, and the like. In some embodiments, the rod 22 may be formed from a plastic, such as polycarbonate, polypropylene, and the like. The rod may be a hollow tube such electrical components (e.g., wires) of a lighting system of the sun visor extend through the hollow tube. In some embodiments, the rod is a solid rod.

Figure 7:
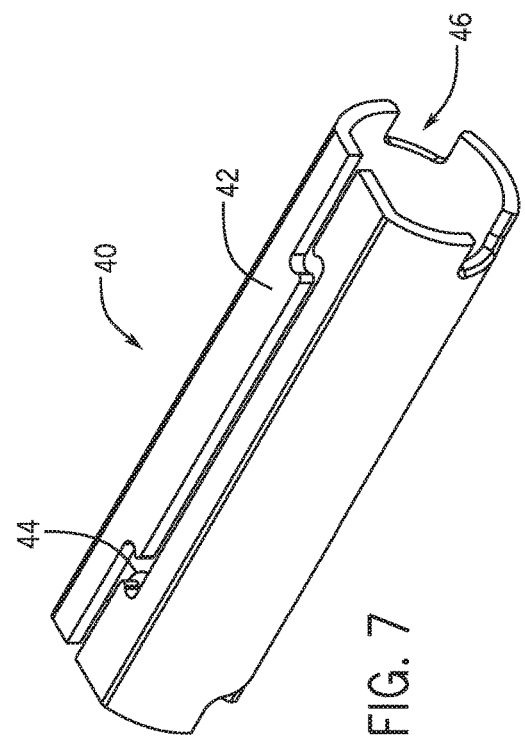
FIG. 7 is a perspective view of an embodiment of a contact element in the form of a sleeve that may be coupled to the rod of FIG. 6.

FIG. 7 is a perspective view of an embodiment of a contact element 40 in the form of a sleeve that may be coupled to the rod of FIG. 6. The contact element 40 is configured to contact a surface of the sun visor assembly (e.g., a contact surface of the biasing element and/or a spring box of the sun visor assembly). Contact between the contact element 40 and the surface may control rotation of the sun visor of FIG. 5 between the stowed position and the usage position. As discussed in detail below, the surface may be driven into contact with the contact element by the biasing element of the sun visor assembly. The contact element 40 is configured to couple to the rod of FIG. 6 and to provide a surface that contacts the corresponding surface of the sun visor assembly during rotation of the sun visor. The contact element 40 may be configured to establish one or more detent positions of the sun visor (e.g., the stowed position, the usage position, etc.). In the illustrated embodiment, the contact element 40 includes one flattened surface 42 corresponding to the stowage position or the usage position. However, in alternative embodiments, the contact element 40 may include more or fewer flattened surfaces (e.g., two flattened surface corresponding to the stowage position and usage position). The biasing element in the sun visor assembly may be configured to apply pressure and/or force to the contact element 40 (e.g., via direct contact with the contact element 40, via urging a spring box against the contact element 40, etc.), such that the biasing element applies pressure to the flattened surface 42 of the contact element 40 when the sun visor is in the detent position. As such, the biasing element and the flattened surface 42 of the contact element 40 may cause the sun visor to resist movement from the detent position.

As illustrated, the contact element 40 is in the form of the sleeve. However, the contact element 40 may be of any suitable design increases the lifetime of the rod and the rod assembly including the rod. For example, the contact element 40 may in the form of a flat plate that is disposed on one or more flattened surfaces of the rod corresponding to the one or more detent positions of the sun visor (e.g., the stowed position, the usage position, etc.). In such embodiments, the flat plate may be coupled to the one or more flatter portions of the rod using any suitable fastener, such as an adhesive, one or more screws, and the like. In some embodiments, the contact element 40 may be surface hardening and/or heat treating at least one or more portions of the rod corresponding to where the biasing element in the sun visor assembly may be configured to apply pressure to the contact element 40. In some embodiments, the contact element 40 may be one or more coatings applied to at least a portion of the rod instead of the sleeve, wherein at least one coating composes a suitable material configured to increase the lifetime of the rod and the rod assembly. In some embodiments, the contact element 40 may include the coating applied to the sleeve coupled to the rod.

The contact element 40 may be formed from any suitable material configured to increase the lifetime of the rod and a rod assembly including the rod. Thus, the contact element 40 may be formed from a material that is harder than the material forming the rod. In this manner, the contact element 40 may have a lifetime greater than that of the rod alone, and increase the lifetime of the rod and the rod assembly. For example, the rod may be formed from plastic, while the contact element 40 may be formed from a metal, such as steel. The contact element 40 may also or alternatively be molded using a mold material that is harder than that of the rod. For example, the contact element 40 may be molded using a two-shot molding process, in which at least the outer layer is formed from a mold material that is harder than that of the rod (e.g., a metal replacement plastic material as compared to a rod made of plastic). In some embodiments, the mold material may be a material that may is more wear-resistant (i.e., sustains a greater amount of wear as applied by the contact surface of the biasing element and/or a spring box of the sun visor assembly when rotating the sun visor) than the material forming the rod. For example, the mold material may include a resin that includes one or more additives that increases wear-resistance (e.g., glass, aramid, carbon fiber, etc.) that may sustain greater wear than the material forming the rod (e.g., plastic, steel, etc.). In some embodiments, the material of the contact element 40 may be harder, more wear-resistant, or a combination thereof when compared to the material of the rod. The contact element 40 may also include one or more inner layers formed from a softer material. The contact element 40 may be of any length less than or equal to the length of the rod.

It should be noted that the material, amount of the material, and/or the configuration of the contact element 40 may be dependent on a variety of factors. For example, the more material used to form the contact element 40 (e.g., the thicker the contact element 40), the less hard the material may be. As another example, the material, amount of the material, and/or the configuration of the contact element 40 may be dependent on at least a surface area of the contact surface configured to contact the contact element 40 (e.g., the surface area of the contact surface of the biasing element and/or a spring box of the sun visor assembly). Specifically, the larger the surface area of the contact surface, the less hard the material may be and/or the less amount of material may be used. The material, amount of the material, and/or the configuration of the contact element 40 may be also or alternatively be dependent on at least a surface finish and/or a friction coefficient of the material. For example, the smoother the surface finish and/or the lower the friction coefficient of the material used in the contact element 40, the less hard the material may be and/or the less amount of material may be used.

A variety of significant benefits may be realized by coupling the contact element 40 to the rod for increasing the lifetime of the rod and the rod assembly. Only the contact element 40 may be hardened to increase the lifetime of the rod and the rod assembly, rather than the entire rod, reducing manufacturing time and costs. For example, the contact element 40 may be formed from a more expensive material and/or be subject to a more expensive and/or time-consuming hardening process(es) (e.g., coating process(es)). Limiting the more expensive material and/or the more expensive and/or time-consuming hardening process(es) to the smaller contact element 40 separate from the rod may reduce manufacturing time and cost. Additionally, the shape of the contact element 40 may be configured to increase the lifetime of the rod and the rod assembly. For maintenance procedures, replacing the smaller contact element 40 may also be simpler and more cost-effective than replacing the entire rod. A thinner rod (e.g., with a smaller diameter, with a smaller wall thickness, etc.) may be used in the sun visor assembly because the contact element 40 bears the contact force applied by the biasing element and/or the spring box when rotating the sun visor. For example, the rod may be between 2 and 12 mm in diameter (e.g., 4 mm, 6 mm, 8 mm, 10 mm, etc.). As such, the contact element 40 may have an inner diameter corresponding to, and approximately equal, to the rod diameter. Manufacturing the thinner rod uses less material and may reduce costs.

Before overmolding the rod, the contact element 40 may be disposed about the rod. In some embodiments, there may be a gap between the contact element 40 and the rod (e.g., formed between an outer diameter of the rod may be less than an inner diameter of the contact element), enabling the contact element 40 to slide over the rod. In such embodiments, the molding material (e.g., polymeric material, etc.) applied to the contact element 40 and the rod during the molding process couples the contact element 40 to the rod and secures the contact element 40 in place. In some alternative embodiments, an opening 44 of the contact element 40 may be used to slide the rod into the contact element 40. The contact element 40 may be closed such that the contact element 40 is held in place by pressure and/or friction. A molding (e.g., overmolding) process may then be performed on the contact element 40 and/or the rod. In some embodiments, the contact element 40 may not be overmolded. In such embodiments, one or more coatings may be applied to the contact element 40 that compose a suitable material configured to increase the lifetime of the rod and a rod assembly including the rod. In some embodiments, the opening 44 may be larger than illustrated, such that the contact element 40 only partially surrounds a portion of the rod. The contact element 40 that partially surrounds the rod is disposed such that the contact element 40 corresponds to a location on the rod that would contact a contact surface of the biasing element and/or the spring box when rotating the sun visor. Similarly, if a coating is used instead as the contact element 40, the coating may only partially surround a portion of the rod, such that the coating corresponds to the location on the rod that would contact the contact surface of the biasing element and/or the spring box when rotating the sun visor. In some embodiments, the coating may be overmolded with the rod. In alternative embodiments, the coating may not be overmolded with the rod. Advantageously, when the contact element 40 is not overmolded with the rod, the one or more coatings may be applied after the overmolding process of the rod. In some embodiments, the one or more coatings may be applied before the overmolding process of the rod, or before and after the overmolding process of the rod.

Once the contact element 40 is positioned about the rod (e.g., in a position corresponding to where contact with the biasing element and/or the spring box will occur), the rod and/or the contact element 40 may be overmolded. The rod and contact element 40 may be placed in an open mold tool. The mold tool may be closed, and mold material may be injected into the closed mold holding the rod and the contact element 40. The mold material used to overmold the rod 22 and/or to couple the contact element 40 to the rod may be any suitable material for supporting the sun visor. For example, the mold material may be any suitable polymeric material. The mold material may be any suitable material used in three-dimensional printing, such as plastic or metal. In some embodiments, the mold material may be a metal, such as cast metal, extruded metal, molded metal, and the like. The mold material may include a coating that is of equal or greater hardness compared to the contact surface, such as a plasma coating, a metal coating, a plastic coating, etc. In some embodiments, the mold material may include more than one material, applied sequentially. For example, the mold process may include first molding the rod and/or contact element 40 with plastic, and then molding the rod and/or contact element 40 with material that is harder than that of the rod. The mold tool may then be opened and the rod and/or contact element 40 removed from the mold tool.

In some embodiments, the opening 44 is configured to be filled by a mold material when the contact element 40 and rod undergo the molding process. While the illustrated contact element 40 includes one opening, it should be appreciated that in alternative embodiments, the contact element 40 may include more or fewer opening (e.g., 0, 1, 2, 3, 4, or more). The opening 44 may establish a stronger bond between the mold material and the contact element 40, reduce the formation of air pockets during the molding process, or a combination thereof. In some embodiments, the contact element 40 is integrated in the molding material (e.g., via the one or more openings 44) in a manner that does not enable movement from the contact element 40 relative to the rod. Advantageously, the contact element 40 may be configured such that the contact element 40 may be molded onto the rod at the same time the rod is overmolded. In this manner, the molding process may be streamlined and more efficient, reducing costs related to overmolding the rod and coupling the contact element to the rod.

As illustrated, the contact element 40 includes two grooves 46 on each end of the contact element 40 configured to facilitate rotation of the sun visor. The grooves 46 may be configured to reduce binding against a spring box in the sun visor when rotating the sun visor. For example, the spring box may include indentations configured to secure the contact element 40, the rod, the biasing element, or any combination thereof, within the spring box. The grooves 46 of the contact element 40 may correspond to the indentations of the spring box, such that, when the sun visor is rotated, the indentations of the spring box (which is rotated with the sun visor), do not bind or catch on a portion of the contact element 40. In some embodiments, the opening 44, the grooves 46, or one or more holes of the contact element 40 may enable a softer rod material to contact the biasing element and/or the spring box. The softer rod material may act as a lubricant, detent surface, bearing surface, or the like, or any combination thereof. In some embodiments, there may be more or fewer grooves (e.g., 0, 1, 2, 3, 5, 6, 7, 8), depending on the configuration of the spring box.

The contact element 40 may be shaped to correspond to a respective location in a mold tool for performing the molding process, such that the contact element 40 may be inserted into the respective location in the mold tool, and it may be easy to detect if the contact element 40 is not in the respective location. For example, a physical characteristic of the contact element 40, such as the flattened surface 42, the opening 44, the grooves 46, a protrusion, or a recess of the contact element 40, may correspond to a structure in the mold tool, such that, when the contact element 40 is properly seated in the mold tool, the physical characteristic of the contact element 40 and the structure in the mold tool are mated together. If the contact element 40 is not properly seated, then it may be easy to detect because the physical characteristic of the contact element 40 and the structure in the mold tool are not mated together. As such, the contact element 40 may be configured to substantially reduce or eliminate the possibility of the contact element 40 being improperly coupled to the rod.

FIG. 8A is a perspective view of an embodiment of a rod assembly 48 having the contact element 40 of FIG. 7 and the rod 22 of FIG. 6, after the rod 22 is molded. As illustrated, the mold material covers the rod 22, except for the end 32. The end 32 may be configured to couple to the mounting assembly of the interior of the vehicle and to facilitate rotation about second rotational axis 16. In the illustrated embodiment, the mold material also does not cover the contact element 40. In some embodiments, the contact element 40 may be disposed at a distal end 50 of the rod 22. In the illustrated embodiment, the contact element 40 is not disposed at the distal end 50 of the rod 22, and instead the distal end 50 extends from the contact element 40. It may be advantageous to dispose the contact element 40 in this position so that electrical components (e.g., wires) of a lighting system of the sun visor extending through an opening at the distal end may be separated from the contact element (e.g., in embodiments in which the contact element 40 is formed from metal). Instead, the electrical components may contact the molding material at the distal end of the rod 22, which may be configured to reduce wear on the electrical components.

FIG. 8B is a perspective view of an embodiment of a rod assembly 49 having a contact element 52 in the form of a coating and the rod 22 of FIG. 6, after the rod 22 is molded. As illustrated, the mold material covers the rod 22, except for the end 32. In some embodiments, the contact element 52 may be disposed at the distal end 50 of the rod 22. In the illustrated embodiment, the contact element 52 is not disposed at the distal end 50 of the rod 22, and instead the distal end 50 extends from the contact element 52. The contact element 52 may compose a suitable material configured to increase the lifetime of the rod and a rod assembly including the rod. For example, the material forming the contact element 52 may be a plastic, while the contact element 52 may be formed from a harder metal, such as steel. The contact element 52 may also be a molded using a mold material that is of equal or greater hardness compared to the contact surface. For example, the contact element 52 may be molded using a two-shot molding process, in which at least the outer layer is formed from a mold material that is of equal or greater hardness compared to the contact surface (e.g., a metal replacement plastic material). The contact element 52 may also include one or more inner layers formed from a softer material. The contact element 52 may be of any length less than or equal to the length of the rod. In such embodiments, the rod 22 may include one or more flattened surfaces 53 that correspond to when the sun visor is in the detent position (e.g., the stowage position, the usage position, etc.), which are covered by the contact element 52.

Figure 9:
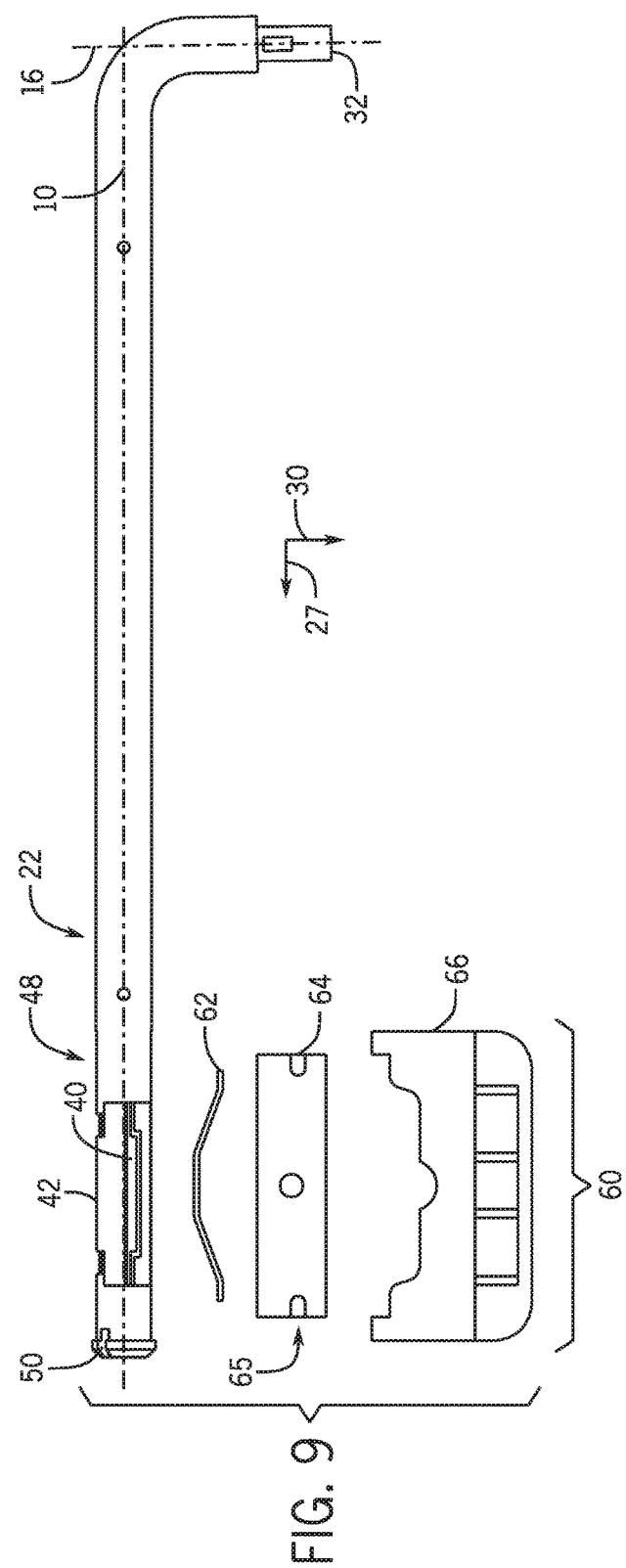
FIG. 9 is an exploded view of an embodiment of a rotation system that includes the rod assembly of FIG. 8.

FIG. 9 is an exploded view of an embodiment of a rotation system 60 that includes the rod assembly 48 of FIG. 8A. In some embodiments, the rod assembly 49 of FIG. 8B may be used instead of the rod assembly 48 of FIG. 8A. The rotation system 60 may include the biasing element 62. The biasing element 62 may be any suitable device that applies pressure to the contact element 40 to control rotation of the sun visor (e.g., between the stowage and usage positions). As illustrated, the biasing element 62 is in the form of a leaf spring. In some embodiments, the biasing element 62 may be one or more leaf springs, coiled springs, compression springs, torsion springs, and the like, as well as any combination thereof. The biasing element 62 may be made of any suitable material that enables the biasing element 62 to apply pressure to the contact element 40, such as metal.

Rotation of the sun visor may be controlled by the contact element 40. For example, the biasing element 62 may urge a contact surface (e.g., of a spring box 64) against the contact element 40 to establish resistance to rotation. In some embodiments, the contact element 40 may include one or more features that control rotation of the sun visor, such as one or more detent surfaces, camming elements, or the like. For example, the contact element 40 may include one or more detent surfaces (e.g., the flattened surface 42) to establish an increased resistance to movement of the sun visor from a corresponding detent position. In some embodiments, contact between the contact surface and the contact element 40 may urge the sun visor toward a detent position when the sun visor is oriented proximate to the detent position and the contact element 40 (e.g., at the intersection of a detent surface and a non-detent surface). As another example, the contact element 40 may include one or more camming elements that control rotation of the sun visor by establishing a variable resistance. In some embodiments, a surface of the contact element 40 (e.g., a non-flattened surface) may be configured to urge the sun visor to a detent position. For example, the contact element 40 may include one or more self-actuation features configured to self-actuate the sun visor toward a detent position, a headliner of the vehicle, a windshield of the vehicle, and the like.

The rotation system 60 also includes a spring box 64 that is configured to rotatably couple to the rod 22. The spring box 64 may surround the contact element 40, and the biasing element 62. The spring box 64 may be of any suitable configuration that enables the biasing element 62 to apply pressure and/or force on the contact element 40 and/or rod 22. The spring box 64 may include indentations 65 configured to secure the rod assembly 48 and/or the biasing element 62 within the spring box 64. The grooves of the contact element 40 may correspond to the indentations 65 of the spring box 64, such that, when the sun visor is rotated, the indentations 65 of the spring box 64 (which is rotated with the sun visor), do not bind or catch on a portion of the contact element 40. The spring box 64 is configured to rotate about the first rotational axis 10 with the sun visor (e.g., when the sun visor is rotated between the stowage position and the usage position), while the contact element 40 remains fixed relative to the rod 22. Contact between the contact element 40 and the biasing element 62 and/or the spring box 64 controls rotation when rotating the sun visor between the stowed position and the usage position. When the sun visor is rotated such that the biasing element 62 and/or a contact surface of the spring box 64 contacts one or more flattened surfaces 42 of the contact element 40 or the rod 22 covered with the contact element 40, corresponding to a detent position of the sun visor, the resistance to rotation may increase, thereby holding the sun visor in the detent position. The spring box 64 may be formed from any suitable material that enables the spring box 64 to contain the contact element 40, and the biasing element 62. For example, the spring box 64 may be formed from metal. In some embodiments, the spring box 64 may be part of or incorporated in the biasing element 62. In some embodiments, there may be no spring box 64, if there is an opposing contact point provided by the rotation system 60 for the biasing element 62 to operate (e.g., an opposing contact point on a carrier 66).

The rotation system 60 includes the carrier 66 that couples to the spring box 64 and rotatably couples to the rod 22. The carrier 66 is configured to be disposed within a channel of the sun visor assembly to provide for lateral movement of the sun visor. The carrier 66 may be formed from any suitable material that enables the carrier 66 to couple to the spring box 64 and the rod 22. For instance, the carrier 66 may be formed from a molded polymeric material. The carrier 66 may provide a bearing surface for the rotation system 60. For example, the biasing element 62 may drive a surface of the spring box 64 and/or the contact element against the carrier 66. The carrier 66 may also be configured to hold the contact element, such that the carrier 66 rotates with the contact element. The carrier 66 may be configured to hold the rotation system 60 in the sun visor assembly and be disposed in the channel of the sun visor assembly, wherein the channel moves laterally along the carrier 66.

FIG. 10 is a perspective view of the rotation system 60 of FIG. 9. The contact element and the biasing element are disposed within the spring box 64, and the carrier 66 is coupled to the spring box and rotatably coupled to the rod 22. The rotation system 60 is configured such that when the sun visor is rotated about the first rotational axis 10, the rod 22 remains fixed relative to the rotation of the sun visor. Because the contact element is coupled (e.g., non-rotatably coupled) (e.g., via pressure and/or frictional coupling, molding, or a combination thereof) and/or the coating is applied to the rod 22, the contact element also remains fixed relative to the rotation of the sun visor about the first rotational axis 10. However, the biasing element, the spring box 64, and the carrier 66 rotate with the sun visor when the sun visor is rotated about the first rotational axis 10. As previously discussed, a contact force is applied between the contact element and the spring box 64 and/or the biasing element when rotating the sun visor about the first rotational axis 10, such that the contact force applied to the rod 22 by the biasing element and/or the spring box 64 is reduced.

FIG. 11 is a perspective view of the rotation system 60 of FIG. 10 disposed within a channel 70 of a sun visor, in accordance with an embodiment of the present disclosure. The channel 70 is configured to enable the rotation system 60 (and the coupled rod 22) to slide in the lateral direction 27 to position the sun visors 6 in a more advantageous position to shield the vehicle occupants from sunlight. As discussed above, the rotation system 60 enables the sun visor 6 to rotate between the stowage position (e.g., parallel to a headliner of the vehicle interior) and the usage position (e.g., deployed to reduce light transmission into the vehicle interior), while a contact force is applied between the contact element and the spring box 64 and/or the biasing element when rotating the sun visor about the first rotational axis 10, such that the contact force applied to the rod 22 by the biasing element and/or the spring box 64 is reduced. In some embodiments, the opening 44, the grooves 46, or one or more holes of the contact element 40 may enable a softer rod material to contact the biasing element and/or the spring box. The softer rod material may act as a lubricant, detent surface, bearing surface, or the like, or any combination thereof.

As illustrated, the rotation system 60 slides on the channel 70 of the sun visor. It should be noted that the rotation system 60 may be used with any suitable sun visor assembly, wherein a sun visor of the sun visor assembly is configured to rotate about a rod of the sun visor assembly. For example, the rotation system 60 may be configured to slide along the rod of the sun visor assembly (instead of the channel 70 as illustrated). In such an example, the portion of the rod corresponding to the location of the rotation system when rotating the sun visor may include the contact element. Moreover, it should be noted that the present disclosure may be employed with non-sliding sun visors as well as sliding sun visors.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the invention, or those unrelated to enablement). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A rotation system for a vehicle sun visor, comprising:
a rod coupled to the vehicle sun visor, wherein the rod is configured to couple to a vehicle to support the vehicle sun visor within an interior of the vehicle, and the rod is configured to facilitate rotation of the vehicle sun visor about the rod;
a contact element non-rotatably coupled to the rod, wherein the contact element comprises a flattened surface and an opening disposed on the flattened surface, wherein the opening is configured to:
facilitate sliding the rod into the contact element; and
be filled by a mold material when the rod and the contact element undergo a molding process; and
a biasing element configured to urge a contact surface of the biasing element against the contact element to control rotation of the vehicle sun visor about the rod.

2. The rotation system of claim 1, wherein the contact element comprises a sleeve that at least partially surrounds a portion of the rod when the sleeve is non-rotatably coupled to the rod.

3. The rotation system of claim 2, wherein the sleeve is non-rotatably coupled to the rod via pressure applied by the sleeve to the rod.

4. The rotation system of claim 1, wherein the contact element is non-rotatably coupled to the rod by the molding material.

5. The rotation system of claim 1, wherein the biasing element comprises the contact surface.

6. The rotation system of claim 1, wherein the contact element comprises a detent feature configured to urge the vehicle sun visor toward a detent position in response to contact with the contact surface when the vehicle sun visor is oriented proximate to the detent position.

7. A rotation system for a vehicle sun visor assembly prepared by a process comprising the steps of:
forming a contact element, wherein the contact element comprises a flattened surface and an opening disposed on the flattened surface, wherein the opening is configured to facilitate sliding the rod into the contact element;
disposing the contact element at least partially about a rod of the vehicle sun visor assembly, wherein the rod comprises a first material;
overmolding the rod with a mold material; and
disposing a spring box about the contact element, wherein the spring box includes a biasing element configured to urge a contact surface of the biasing element against the contact element to control rotation of a sun visor about the rod, wherein the contact element comprises a second material that is harder, more wear-resistant, or a combination thereof, when compared to the first material.

8. The rotation system of claim 7, wherein disposing the contact element about the rod comprises disposing the contact element at a distal end of the rod.

9. The rotation system of claim 7, wherein there is a gap formed between an outer diameter of the rod and an inner diameter of the contact element when the contact element is disposed at least partially about the rod, and wherein overmolding the rod comprises filling the gap with the mold material.

10. The rotation system of claim 7, wherein overmolding the rod comprises overmolding the contact element and the rod together by filling the opening with the mold material.

11. The rotation system of claim 7, wherein overmolding the rod comprises overmolding the contact element and the rod together.

12. The rotation system of claim 7, wherein overmolding the rod comprises overmolding the contact element and the rod together using the mold material, wherein the contact element is integrated into the mold material such that the mold material blocks movement of the contact element relative to the rod.

13. A vehicle sun visor assembly, comprising:
a vehicle sun visor;
a rod coupled to the vehicle sun visor, wherein the rod is configured to couple to a vehicle to support the vehicle sun visor within an interior of the vehicle, and the rod is configured to facilitate rotation of the vehicle sun visor about the rod;
a contact element non-rotatably coupled to the rod, wherein the contact element comprises a flattened surface and an opening disposed on the flattened surface, wherein the opening is configured to:
facilitate sliding the rod into the contact element; and
be filled by a mold material when the rod and the contact element undergo a molding process;
a biasing element configured to urge a contact surface of the biasing element against the contact element to control rotation of the vehicle sun visor about the rod; and
a spring box configured to surround the contact element and the biasing element, wherein the spring box or the biasing element comprises the contact surface.

14. The vehicle sun visor of claim 13, wherein the contact element comprises one or more coatings applied to at least a portion of rod, wherein at least one coating of the one or more coatings comprise a first material that is of greater hardness compared to a second material of the rod.

15. The vehicle sun visor of claim 13, comprising a channel configured to provide for lateral movement of the vehicle sun visor.

16. The vehicle sun visor of claim 15, comprising a carrier coupled to the spring box and rotatably coupled to the rod, wherein the channel moves laterally along the carrier.

17. The vehicle sun visor of claim 13, wherein the biasing element comprises a leaf spring.

18. The rotation system of claim 7, wherein the mold material comprises a third material that is harder, more wear-resistant, or a combination thereof, when compared to the first material.

* * * * *